Figure 1:
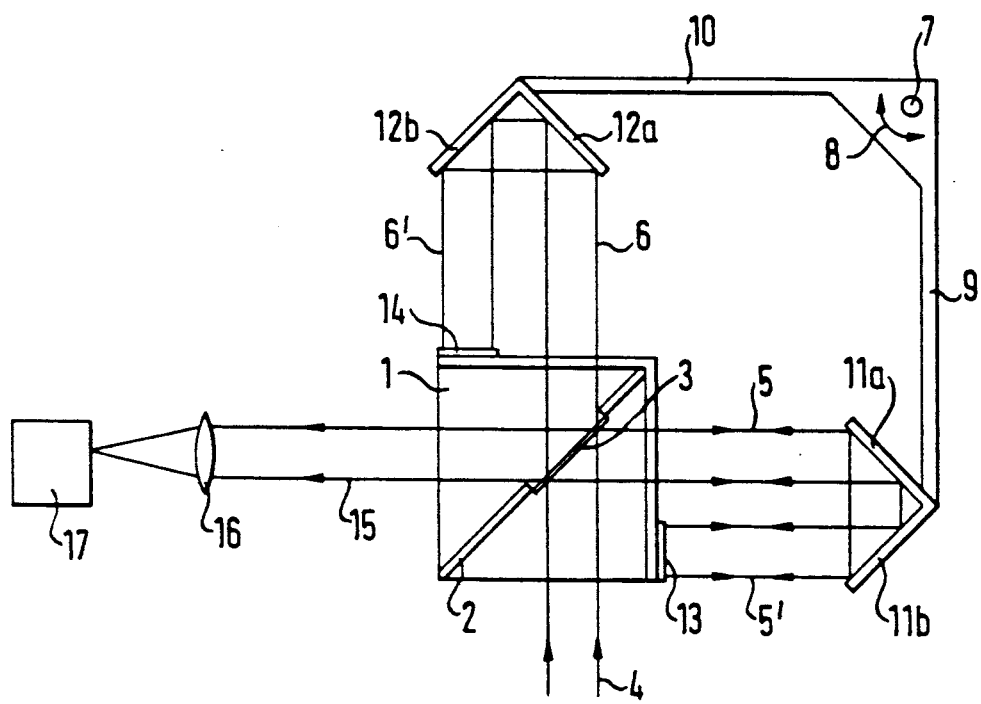

United States Patent [19]

Rippel

[11] Patent Number: 5,066,990
[45] Date of Patent: Nov. 19, 1991

[54] REFLECTOR SYSTEM FOR MICHELSON INTERFEROMETERS

[75] Inventor: Harald Rippel, München, Fed. Rep. of Germany

[73] Assignee: Erwin Kayser - Threde GmbH, Munich, Fed. Rep. of Germany

[21] Appl. No.: 437,198

[22] Filed: Nov. 16, 1989

[30] Foreign Application Priority Data

Nov. 17, 1988 [EP] European Pat. Off. ........ 88119124.1

[51] Int. Cl.$^5$ .............................................. G01B 9/02
[52] U.S. Cl. ...................................................... 356/346
[58] Field of Search ................ 356/346, 345, 351, 358

[56] References Cited

U.S. PATENT DOCUMENTS

| 4,773,757 | 9/1988 | Doyle | 356/346 |
| 4,784,490 | 11/1988 | Wayne | 356/351 |
| 4,810,092 | 3/1989 | Auth | 356/346 |

FOREIGN PATENT DOCUMENTS

3005520C2  2/1980  Fed. Rep. of Germany .

OTHER PUBLICATIONS

Burkert, Peter, F. Fergg, and H. Fischer, "A Compact High-Resolution Michelson Interferometer for Passive Atmospheric Sounding (MIPAS)," *IEEE Transactions on Geoscience and Remote Sensing*, vol. GE-21 (1983), Jul., No. 3, New York, U.S.A. pp. 345-349.

*Primary Examiner*—Samuel Turner
*Attorney, Agent, or Firm*—Rothwell, Figg Ernst & Kurz

[57] ABSTRACT

A reflector system for Michelson interferometers comprises: a beam splitter arranged in the measurement ray path, which splits the measurement beam path into two split ray paths; a first mirror arrangement in each split ray path reflecting parallel to the incident ray; and at least one second mirror reflecting parallel to the incident ray, which is arranged in the ray path reflected from one of the first mirror arrangements and is coupled to the beam splitter, a partially transparent reflector serving as beam splitter, and the beam splitter and second mirror being arranged on a common carrier.

10 Claims, 2 Drawing Sheets

REFLECTOR SYSTEM FOR MICHELSON INTERFEROMETERS the invention relates to a reflector system for Michelson interferometers comprising: a beam splitter arranged in the measuring ray path which divides the measuring fray path into two split ray paths; a first mirror arrangement in each split ray path reflecting parallel to the incident ray; and at least one second mirror reflecting parallel to the incident ray which is arranged in the ray path reflected by one of the first mirror arrangements and is coupled to the beam splitter.

Such reflector systems for Michelson interferometers are known, e.g. from DE 30 05 520 C2. In the arrangement disclosed therein the beam splitter and the second mirror have mutually separate constructional arrangement.

Furthermore, in the publication "IEEE Transactions on Geoscience and Remote Sensing", Vol. GE-31, No. 3, pages 345 to 349, published on 3 July 1983, a Michelson interferometers is described in which the beam splitter is formed by two glass prism cemented together on whose hypotenuse surfaces a measuring ray is divided and brought together again and the or each second mirror is mounted on the catchers surfaces of these prisms.

In such systems, the problem always arises of compensating differing temperature conditions in the interferometer as far as possible in order to achieve the greatest possible modulation depth. As is known, the modulation depth M is expressed by the relationship $M = I_M/I_{DC}$, in which $I_M$ signifies the modulated intensity and $I_{DC}$ indicates the constant light itnensity. In this connection, the theoretically conceivable value $M = 1$ is in practice never achieved; practically achievable values for M lie between 0.5 and 0.8.

In the interests of the smallest possible influence on the modulation depth, interferometers are usually provided with a thermostat, i.e. mounted in arrangements within which the greatest possible temperature constancy is sought with the most uniform temperature distribution possible. In practice however, such systems are limited since the temperature regulation is limited according to the temperature conditions at particular points or in particular narrow partial regions within the instrument, so that certain temperature differences within the instrument usually cannot be completely avoided. On the other hand, the technical expenditure of providing a thermostat in the instrument is not inconsiderable which markedly increases the costs for manufacture and operation.

The invention is based on the object of providing a reflector system for a Michelson interferometer in which the temperature sensitivity is reduced.

According to the invention, this is achieved in a reflector system of the type initially mentioned in that a partially transparent reflector serving as beam splitter and the second mirror are arranged on a common carrier.

By this means, in a surprisingly simple manner the temperature sensitivity of the system is reduced as a result of which evening the absence of a thermostat a high degree of constancy of the modulation depth is achieved. It has provided that with the reflector system according to the invention the modulation depth of the interferometer changes by less than 1% per degree, whilst with previous constructions changes of 5% per degree or even larger changes had to be accepted In spite of this, in the construction according o the invention by he omission of the thermostat the production and operating costs for the interferometer are held low.

Further embodiments of the invention appear from the claims dependent on claim 1.

Figure 2:
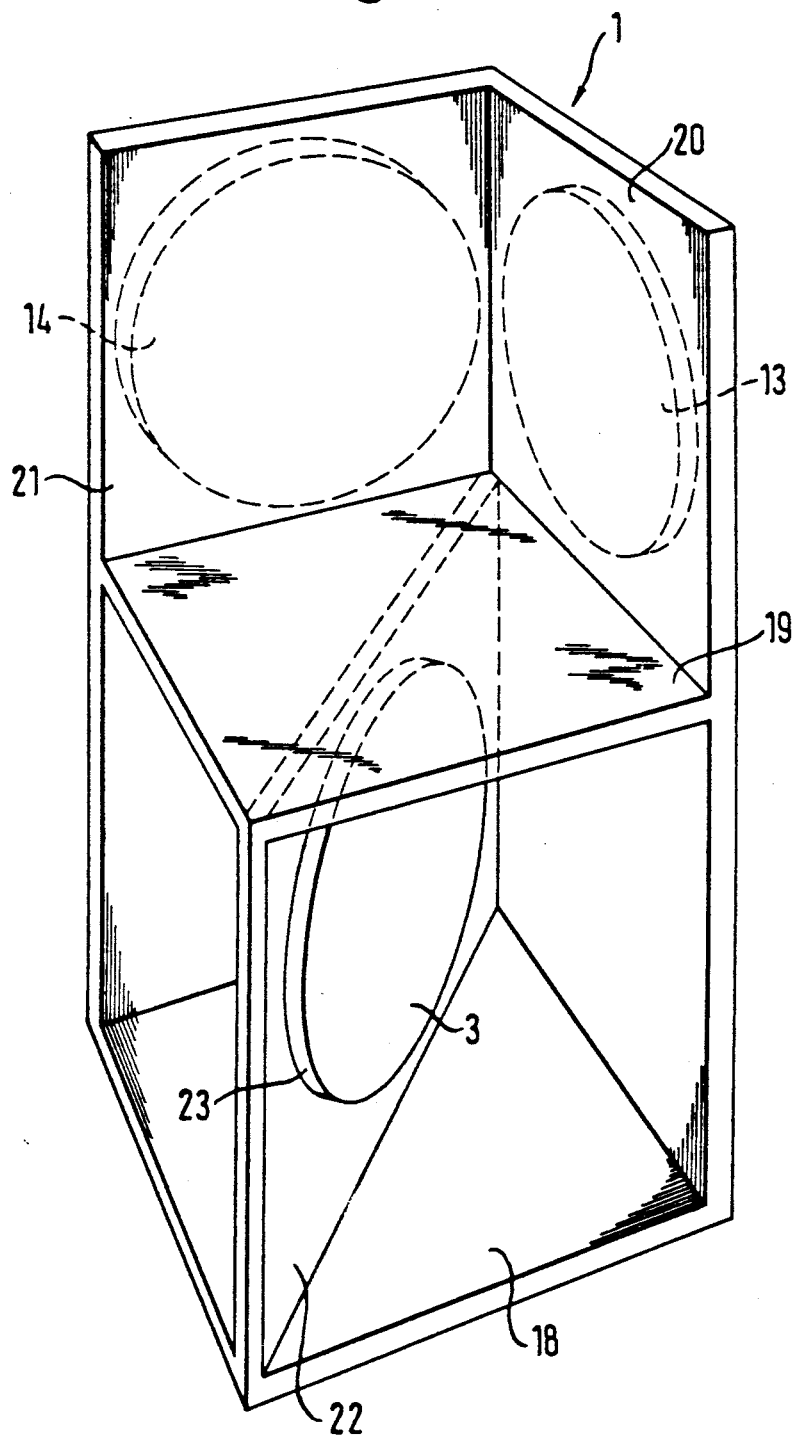

An exemplary embodiment of the invention will be described in more detail in the following on the basis of the accompanying drawings, in which:

FIG. 1 shows a michelson double pendulum interferometer in a diagrammatic representation; and FIG. 2 shows an embodiment of the reflector system contained in FIG. 1 in enlarged perspective view.

FIG. 1 illustrates a Michelson double pendulum interferometer which has, within an instrument housing or frame which is not illustrated, a carrier 1 which has a rectangular or square cross-section, for the reflector system which will be described in more detail below. Within this carrier is arranged a surface 2 on which, as will be described in more detail below, a semi-transparent reflector 3, serving as a beam splitter is arranged. In the described embodiment, this is inclined to the ray path 4 of the incident light to be measured by an angle of 45° and divides the measurement light ray path into the two split beam paths 5 and 6.

About an axis 7 mounted on the non-represented housing or frame of the interferometer, a double pendulum 8 is rotatable and has two mutually perpendicular pendulum arms 9 and 10. Each of these pendulum arms carries a first mirror arrangement reflecting the incident ray parallel thereto, which mirror arrangement is constructed in the illustrated exemplary embodiment as a ridge reflector with reflector elements 11a,11b or 12a,12b meeting at right angles along a ridge. In this way, the reflector element 11a or 12a receives the split incident ray path 5 or 6 of the measurement light at an angle of 45° and reflects it to the reflector element 11b or 12b, from where the split ray path 5 or 6 emerges as a laterallyoffset ray path 5" or 6" parallel to the incident ray path and impinges perpendicularly in each case on a second mirror 13 or 14 reflecting the incident ray parallel to itself. The two second mirrors 13,14 are arranged on the carrier 1 as will be described in more detail below.

The mirrors 13,14 reflecting the ray parallel to itself return the rays of the ray path 5' or 6' incident thereon back to the ridge reflectors 11a,11b or 12a,12b where they are again laterally offset and return again along the ray paths 5 or 6 of the incident split ray paths 5,6 onto the partially transparent reflector 3 of the carrier and pass along the ray path 15 through a convergent lens 16 to a detector 17 which effects the interferometric evaluation.

The above described first mirror arrangements, which reflect the incident ray parallel to itself, can also be constructed as triple mirrors in the form of a so-called corner reflector, instead of the ridge mirror.

With reference to FIG. 2, now the construction of a prepared embodiment of the carrier 1 for the partially transparent reflector 3 and for the second mirrors 13 and 14 of the reflector system will be described in more detail.

Carrier 1 has a square lower plate 18 and, parallel thereto, a similarly constructed upper plate 19 on which along two sides in the described exemplary embodiment the perpendicular side walls 20,21 are mounted and extend beyond the upper plate 19. The parts 18,19,20,21 together form part of a parallelepiped or cubical frame.

The angles between the two side walls 20,21 and the geometrical shape of the frame formed by the carrier 1 depend upon the construction of the interferometer. Thus the above mentioned angle can also have values other than 90°.

Between the parallel upper and lower plates 18,19, a diagonal wall 22 extends along the diagonal surface 2. In a circular aperture 23 of the same, is located the partially transparent reflector 3, whilst the mirrors 13,14 reflecting the incident ray parallel to itself are mounted on the upstanding parts of the side walls 20,21.

In the exemplary embodiment according to FIG. 2, the mirrors 13,14 are arranged above the partially transparent reflector 3 effective as a beam splitter. They can however also be arranged laterally thereof as illustrated in principle in FIG. 1

By the spatially compact arrangement of the partially transparent reflector 3 effective as beam splitter and the second mirrors 13,14 on the common carrier 1, is achieved that these components of the interferometer have largely corresponding temperature values, whereby the temperature sensitivity of the system is considerably reduced.

For further reduction of the temperature differences, the carrier is expediently manufactured of aluminum, since this material has high heat conductivity. In the interests of good conductivity, the carrier 1 consisting of the walls 18,19,20,21 and 22 is preferably constructed in one piece e.g. as an extruded aluminum component.

The beam splitter 3 constructed as a partially transparent reflector can preferably be manufactured from KBR, ZnS, ZnSe, CaF, Ge or Si.

I claim:
1. A reflector system for a Michelson interferometer, comprising:
    a beam splitter arranged in a measurement beam path and having a partially transparent reflector for dividing a measurement light beam into first and second split beam paths;
    first and second multi-reflecting arrangements respectively arranged in said first and second split beam paths for reflecting an incident light beam parallel to its incident beam path;
    first and second mirrors respectively arranged in said parallel beam paths of said first and second multi-reflecting arrangement for reflecting light beam incident thereon back to said first and second multi-reflecting arrangements;
    a movable two-arm pendulum for carrying said first and second multi-reflecting arrangements; and
    a carrier for carrying said beam splitter and said first and second mirrors, said carrier being formed of one unitary piece, wherein said one unitary piece comprises first and second perpendicular side walls, said beam splitter being mounted on a diagonal wall between planes of said first and second side walls, and said first and second mirrors being respectively mounted on said first and second side walls on surfaces opposite said beam splitter.

2. The reflector system of claim 1, wherein said side walls are composed of aluminum.

3. The reflector system of claim 1, wherein said one unitary piece further comprises at least one plate disposed between said first and second side walls and extending in a direction perpendicular to both said first and second side walls.

4. The reflector system of claim 3, wherein said diagonal wall includes an aperture for retaining said beam splitter.

5. The reflector system of claim 4, wherein said one unitary piece e forms a a cubical frame.

6. The reflector system of claim 1, wherein said partially transparent reflector is formed of KBR, ZnS, ZnSe, CaF, Ge or Si.

7. The reflector system of claim 2, wherein said partially transparent reflector is formed of KBR, ZnS, ZnSe, CaF, Ge or Si.

8. The reflector system of claim 3, wherein said a partially transparent reflector is formed of KBR, ZnS, ZnSe, CaF, Ge or Si.

9. The reflector system of claim 4, wherein said partially transparent reflector is formed of KBR, ZnS, ZnSe, CaF, Ge or Si.

10. A michelson interferometer, comprising a reflector system including:
    a beam splitter arranged in a measurement beam path and having a partially transparent reflector for dividing a measurement light beam into first and second split beam paths;
    first and second multi-reflecting arrangements respectively arranged in said first and second split beam paths for reflecting an incident light beam parallel to its incident beam path;
    first and second mirrors receptively arranged in said parallel beam paths of said first and second multi-reflecting arrangements of reflecting light beams incident thereon back to said first and second multi-reflecting arrangements;
    a movable two-arm pendulum for carrying said first and second multi-reflecting arrangements; and
    a carrier for carrying said beam splitter and said first and second mirrors, said carrier being formed one unitary piece, wherein said one unitary piece comprises first and second perpendicular side walls, said beam splitter being mounted on a diagonal wall between planes of said first and second side walls, and said first and second mirrors being respectively mounted on said first and second side walls on surfaces opposite said beam splitter.

* * * * *